A. B. SALIGER.
TIRE CHAIN.
APPLICATION FILED OCT. 30, 1907.
995,372.
Patented June 13, 1911.
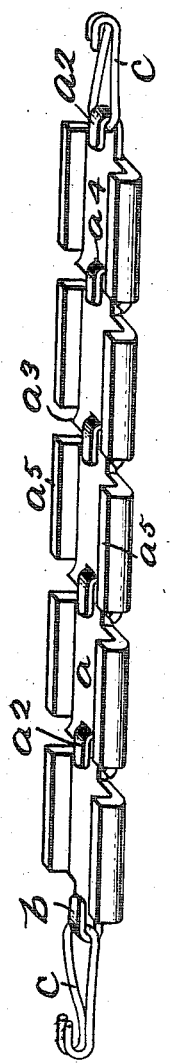
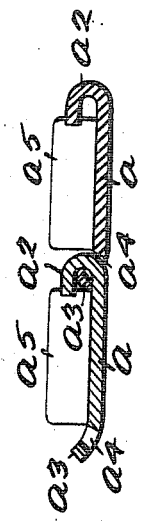
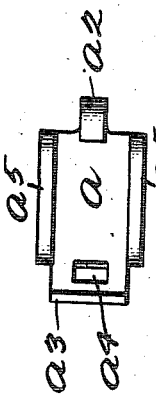
WITNESSES
Victor Sandahl
Henry F. Herman
INVENTOR
Chris B. Saliger

UNITED STATES PATENT OFFICE.

ALOIS B. SALIGER, OF NEW YORK, N. Y.

TIRE-CHAIN.

995,372.

Specification of Letters Patent. Patented June 13, 1911.

Application filed October 30, 1907. Serial No. 399,822.

*To all whom it may concern:*

Be it known that I, ALOIS B. SALIGER, a citizen of the United States, residing at New York, in the county of New York and State of New York, have invented certain new and useful Improvements in Tire-Chains, of which the following is a specification.

The object of this invention is to provide a chain adapted to be used as a grip and non-skidding device on the tires of vehicles, and which is so constructed that it will not injure the tire but will prevent skidding and slipping of the wheels, and which has great wearing surface so as to insure durability. I attained this result by constructing the links of a chain of such form as to have one side perfectly flat and smooth while the opposite side contains a plurality of upturned flanges which are adapted to engage the road bed upon which the vehicle travels.

A further object of my invention is a chain the links of which are constructed so that they are readily interchangeable, so that worn out links may easily be replaced.

The tire chain herein described is adapted to be used in connection with any other side chain or fastening devices now commonly used.

My invention is fully disclosed in the following specification of which the accompanying drawings form a part, in which similar reference characters are used to indicate similar parts in each of the views and in which—

Figure 1 is a perspective view of my chain. Fig. 2 is a top view of one link thereof, and Fig. 3 is a cross section through the middle of two links joined together.

The chain consists essentially of links each of which consists of a bottom plate $a$, a hook $a^2$ at one end thereof, and an integral part of it, a lug $a^3$, provided with a hole $a^4$ at the opposite end, and upwardly extending flanges $a^5$, also integrally connected with said bottom plate $a$. The end links of each chain are provided with the hook $b$, instead of the lug $a^3$, to provide suitable and uniform means for securing the chain to the tire.

On each end of a chain is placed an attaching hook which is adapted to secure the cross chain proper to the side chains or other suitable fastening device, not herein shown.

In practice, the flat side of the chain is placed against the tire, thus avoiding the wear and tear of tires occasioned by ordinary chains. It is also obvious that by simply bending back the hook $a^2$ any link may be removed and another one replaced, so that inasmuch as the center link wears out much faster than the rest, a considerable economy is effected by replacing the worn out link instead of replacing the entire cross chain, as is now commonly the practice. It is also obvious that a chain may be made of various lengths so as to fit on different size tires and that it may be made of any suitable metal and where steel is used may either be left soft or case-hardened or tempered, without departing from the spirit of my invention or sacrificing its advantages.

Having described my invention what I claim is new and desire to secure by Letters Patent is:—

A device of the class described comprising a plurality of links each of which consists of a bottom plate $a$, a hook $a^2$ at one end, the bent over portion of said hook being parallel to said bottom plate $a$; a lug $a^3$ directed obliquely upward and provided with a hole $a^4$, at the other end; flanges $a^5$ on the side and upwardly directed; end links provided with a hook $b$ in place of the lug $a^3$, and an attaching hook $c$ at each end of said device substantially as shown and described.

In testimony whereof, I have signed my name to this specification in the presence of two subscribing witnesses, this 20th day of Oct. 1907.

ALOIS B. SALIGER.

Witnesses:
VICTOR SANDAHL,
HENRY F. HERMAN.